Oct. 25, 1927.
J. F. PANYARD
1,646,978
PISTON PACKING
Filed Oct. 19, 1925
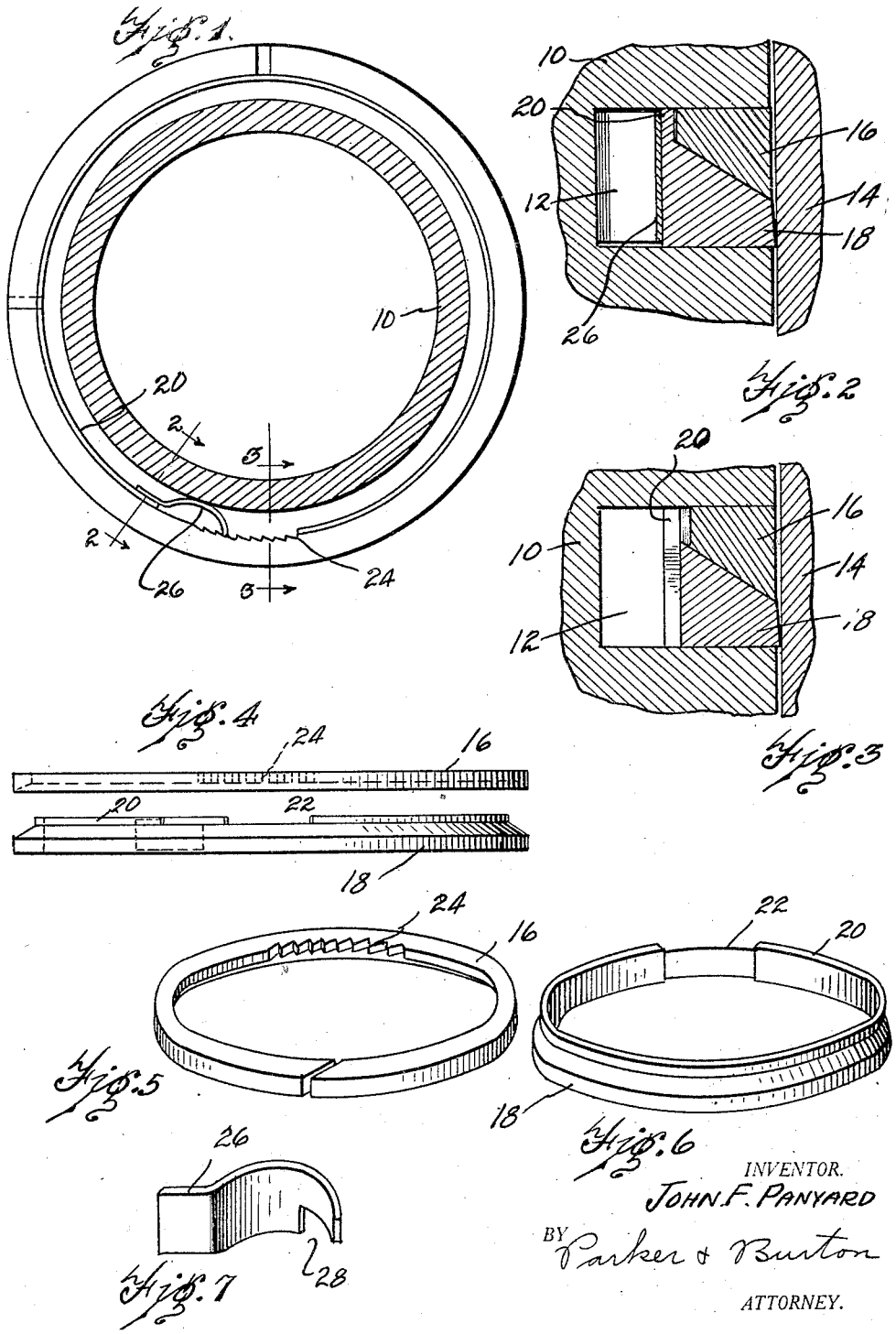
INVENTOR.
JOHN F. PANYARD
BY Parker & Burton
ATTORNEY.

Patented Oct. 25, 1927.

1,646,978

UNITED STATES PATENT OFFICE.

JOHN F. PANYARD, OF DETROIT, MICHIGAN.

PISTON PACKING.

Application filed October 19, 1925. Serial No. 63,331.

My invention relates to improvements in piston packing and particularly to that type of packing in which a packing ring having a helical axial face is rotatably disposed within the groove in the piston whereby upon rotation in a given direction the packing is wedged against the side walls of the groove.

The object of my invention is to provide in packing of the character described improved means adapted to hold the packing against rotation in a given direction while permitting rotation in the opposite direction, and a meritorious feature consists in the provision of a device adapted to automatically retain the packing against rotation tending to diminish its axial dimension while permitting rotation tending to increase the axial dimension.

An advantageous object consists in the employment in conjunction with a pair of cooperating ring sections having helical meeting faces of mechanism engaging the ring sections and holding them at different adjusted positions against relative rotation in a given direction, and a convenient form of means suitable for the purpose is a spring device tensioned to engage the packing rings at different positions of relative rotation to prevent rotation which would diminish the combined axial dimension of the rings.

The above objects and advantages together with other meritorious features will more fully appear from the following specification, appended claims and accompanying drawings, in which:

Figure 1 is a cross-sectional view through a piston showing my improved packing in position in the packing groove.

Fig. 2 is a cross-sectional view taken on line 2—2, Fig. 1.

Fig. 3 is a cross-sectional view taken on line 3—3, Fig. 1.

Fig. 4 is a side elevation of packing rings embodying my invention.

Fig. 5 is a perspective of one of the packing rings illustrated in Fig. 4.

Fig. 6 is a perspective of the other packing ring illustrated in Fig. 4.

Fig. 7 is a perspective of a spring locking member associated with the packing rings.

In the embodiment of my invention illustrated herewith let 10 indicate a piston provided with a suitable packing groove 12, and in Figs. 2 and 3 a broken away portion of the cylinder wall is indicated as 14. My improved packing is mounted in the piston groove 12. As here illustrated it consists of a pair of ring sections 16 and 18 which have helical meeting faces whereby upon rotation of one ring section counter the other the combined axial dimension of the packing is increased.

As here illustrated I have preferred to provide ring section 18 with a base flange 20 which is cut away for a portion of the circumference of the ring as shown at 22 to expose the serrated edge 24 of the inner circumference of ring section 16.

Secured to the base flange 20 to overhang the recess formed by cutting out a portion of the flange is a spring member 26 which is here shown as being arcuate in form and having its convex face abutting the bottom of the groove in the piston. This spring member may be formed as shown in Fig. 7, having a width substantially equal to the width of the groove to cut out at 28 to provide a portion to extend alongside the ring section 18 to engage the serrations 24 of ring section 16 to prevent rotation in a given direction of such ring section 16 relative to the ring section 18. As appears in Fig. 1, this spring 26 is constrained between the bottom of the groove and the packing so that the engaging end thereof is always held against the serrations 24, which notches are cut as shown in Figs. 1 and 5 in such a manner as to permit rotation of the ring member 16 as illustrated in Fig. 1 in a counter-clockwise direction while preventing return rotation of this ring section.

In operation my packing is installed in the provided groove in the piston and the ring sections are rotated by gripping their peripheries so as to fill the groove and the spring 26 holds them at that position of adjusted relative rotation to which they have been brought. It is possible, therefore, to employ this packing very satisfactorily as a replacement packing, installing the same in grooves which vary and run over-width, and by adjusting the packing after it is in the groove it may be brought to the required axial dimension to prevent leakage of compression along the side walls of the groove.

In addition to the provision for axial expansion by rotation of one ring section counter the other, it is to be noted that the helical meeting faces are beveled so that as ring section 18 wears more rapidly than ring section 16, once ring section 16 is brought into engagement with the cylinder wall a wedging action will be exerted by ring section 16. This is in addition to the wedging action produced by the rotatable movement.

What I claim is:

1. In piston packing, a piston having a groove for packing, packing in said groove comprising a pair of ring sections having helical meeting faces whereby upon rotation of one section counter the helical meeting face of the other the packing is wedged axially against the side walls of the groove in the piston, and locking means adapted to automatically hold one of said sections at different positions of rotation relative to the other.

2. In piston packing, a piston having a groove for packing, packing in said groove comprising a pair of ring sections having helical meeting faces whereby upon rotation of one section counter the helical meeting face of the other the packing is wedged axially against the side walls of the groove in the piston, and means adapted to lock said sections against relative rotation in one direction while permitting relative rotation in the opposite direction.

3. In piston packing, a piston having a groove for packing, packing in said groove comprising a pair of ring sections having helical meeting faces whereby upon rotation of one section counter the helical meeting face of the other the packing is wedged axially against the side walls of the groove in the piston, and spring means engaging said sections to automatically lock them against relative rotation in one direction.

4. In piston packing, a piston having a groove for packing, packing in said groove comprising a pair of ring sections having helical meeting faces whereby upon rotation of one section counter the helical meeting face of the other the packing is wedged axially against the side walls of the groove in the piston, and spring means positioned in the bottom of the groove in the piston adapted to automatically lock said sections against relative rotation to diminish the combined axial dimension while permitting relative rotation to increase the combined axial dimension.

5. In piston packing, a piston having a groove for packing, packing in said groove comprising a pair of ring sections having helical meeting faces whereby upon rotation of one section counter the helical meeting face of the other the packing is wedged axially against the side walls of the groove in the piston, and spring means engaging said rings to hold them against relative rotation to diminish the combined axial dimension of the packing adapted to permit relative rotation to increase the combined axial dimension of the packing.

6. In piston packing, a piston having a groove for packing, packing in said groove comprising a pair of ring sections having helical meeting faces whereby upon rotation of one section counter the helical meeting face of the other the packing is wedged axially against the side walls of the groove in the piston, and locking means carried by one ring section engaging the other ring section to hold said sections against relative rotation in one direction while permitting relative rotation in the opposite direction.

7. In piston packing, a piston having a groove for packing, packing in said groove comprising a pair of ring sections having helical meeting faces whereby upon rotation of one section counter the helical meeting face of the other the packing is wedged axially against the side walls of the groove in the piston, a locking device carried by one ring section, and locking recesses formed on the other ring section, said locking device engaged in said recesses to automatically hold said sections against relative rotation in one direction.

8. In piston packing, a piston having a groove for packing, a ring section rotatably mounted in said groove having a helical axial face, said groove provided with an opposed axial helical face, and means engaging said ring section to hold it against rotation in the groove in one direction while permitting rotation in the opposite direction.

9. In piston packing, a piston having a groove for packing, a ring section rotatably mounted in said groove having a helical axial face, said groove provided with an opposed axial helical face and a spring device automatically operable to hold said ring at adjusted positions of rotation against rotation in a given direction.

In testimony whereof, I sign this specification.

JOHN F. PANYARD.